March 17, 1953  A. T. BAILEY  2,631,348
FASTENING DEVICE
Filed June 16, 1949
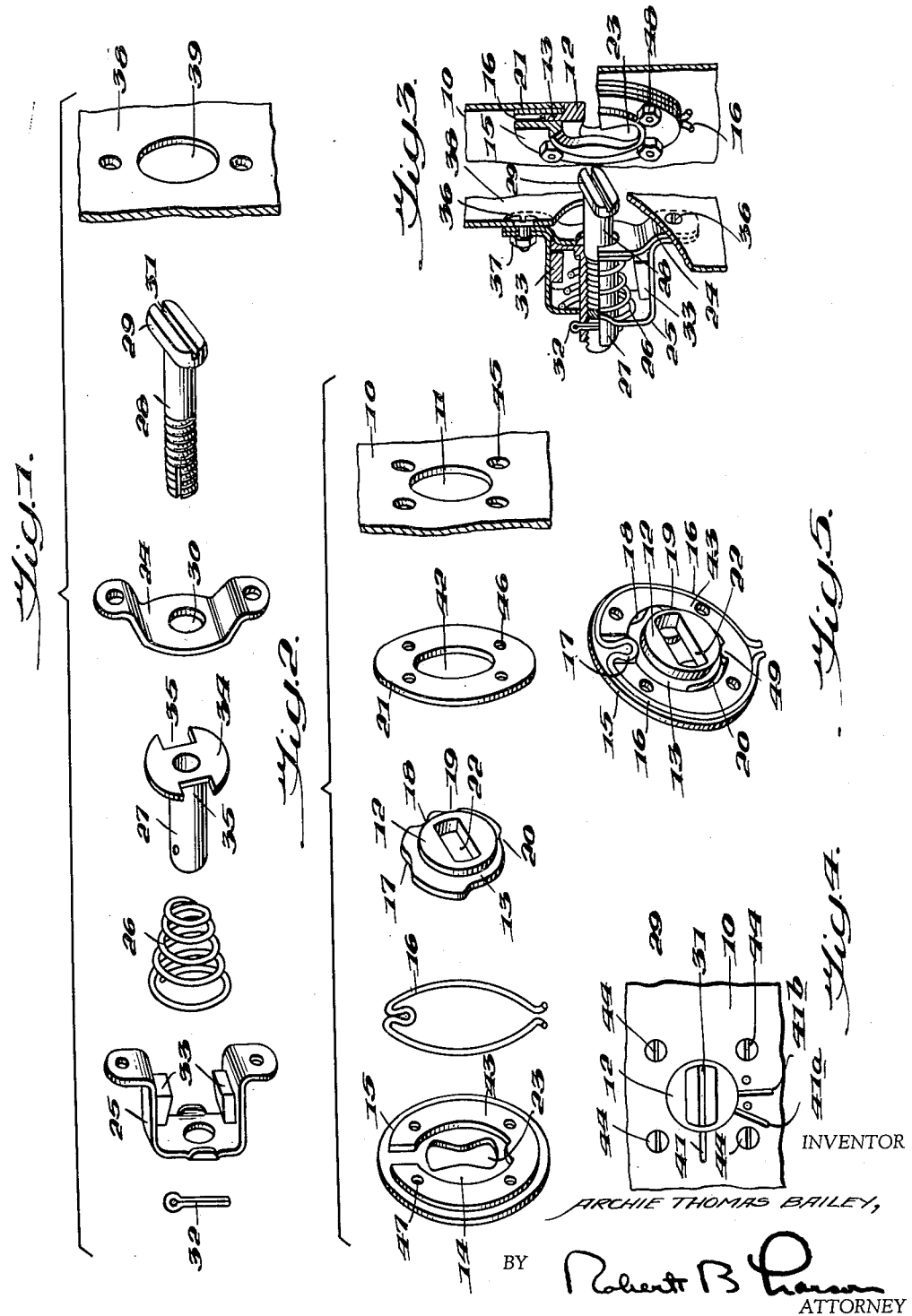
INVENTOR
ARCHIE THOMAS BAILEY,
BY Robert B. Pearson
ATTORNEY Patented Mar. 17, 1953

2,631,348

UNITED STATES PATENT OFFICE 2,631,348

FASTENING DEVICE

Archie Thomas Bailey, Hampton Hill, England, assignor to The Fairey Aviation Company Limited, Hayes, England Application June 16, 1949, Serial No. 99,544
In Great Britain June 25, 1948

11 Claims. (Cl. 24—221)

This invention relates to fastening devices for detachably securing together two parts of a structure, and has especial, but not exclusive, reference to fastening devices for aircraft cowlings and like panel members. There have been many prior proposals for such devices. The main desiderata are that the device should be operably accessible without the use of special tools and should be flush-fitting with minimum interference with the otherwise smooth external surface of the aircraft structure; in addition it should be simple to manufacture and of course should exercise a firm grip on the cowling or like panel.

While the present invention seeks to provide a device possessing all these desiderata, which are obtained in varying degree by other proposals, it has further objects also in view. Of these perhaps the most important is the provision of a fastening device which will allow the cowling or panel to be detached by movement in substantially its own plane, that is, by being slidden away. This removal by sliding cannot be accomplished with known types of fastening device of the kind in which, even after disengagement, parts of the device would foul one another if a sliding removal of the panel were attempted. Such fouling can, of course, in the case of a large panel, be avoided if the panel is bent or "sprung" or otherwise deformed, but such deformation is undesirable, and may result in permanent buckling of the panel, while if the rigidity and/or dimensions of the panel would not permit it, such known fastening devices could not be employed in positions where sliding removal is necessary.

According to the present invention a fastening device for securing two members comprises an apertured body or fastening element arranged to be attached to the first member and to form a bearing for a rotatable apertured socket, and a T-bolt rotatably carried in support arranged to be secured to the second member, said T-bolt being slidable axially against spring means from an extended to a stowed position and having means to retain it at will in said stowed position, the aperture in the body being so shaped that in one angular setting of the extended position of the T-bolt the cross-limbs of the head thereof overlap portions of the margin of the aperture of the body, so securing the two members together, while in another angular setting of the T-bolt, when said bolt is retained in the stowed position, the cross-limbs are disengaged from the body and the two members are free to be separated by sliding.

The face of the body normally directed towards the second member may be flared around the aperture to facilitate engagement of the head of the T-bolt in said aperture, even when the bolt and aperture are slightly out of register, by causing the register to be attained as the two members are brought together.

The socket may be formed with an aperture similar in configuration to the head of the bolt, and may be rotatable in the body against spring means arranged to maintain the socket in either of the angular settings.

Means may be provided for axial adjustment of the body relatively to the first member.

Preferably means are provided to permit the T-bolt to be turned to a third angular setting, while in the extended position, in which the cross-limbs are disengaged from the body and the two members are free to be separated by movement in the direction of the axis of the T-bolt.

One form of the invention will be described with reference to the accompanying drawings, in which:

Figure 1 is an exploded perspective view of those parts of a fastening device which are mounted on one of the two members to be fastened, Figure 2 is an exploded perspective view of those parts of the device which are mounted on the other of the two members, Figure 3 is a perspective view, partly broken away, of an assembled device, and Figure 4 is an external view of the device.

Figure 5 is a perspective view, showing the socket member assembled.

Referring to the drawings, a cowling panel 10 constituting the first member is formed with a round hole 11 to accommodate the spigot 12 of a socket 13, which is rotatable in the hole 11 in the panel 10 and in a circular aperture 42 in a ring 21 secured between the inner side of the panel 10 and a horse-shoe shaped protuberance 43 on a body 15 by bolts 44 passing through apertures 45 in the panel 10, apertures 46 in the ring 21 and apertures 47 in the body 15, the bolts 44 being held by nuts 48 on the inner face of the body 15. The socket 13 is rotatable in the space 14 within the horse-shoe shaped protuberance and an annular circlip spring 16, between the body 15 and the ring 21, is arranged to exert pressure on notches 17, 18, 19 formed on the periphery of the socket 13, so as to maintain said socket in predetermined angular positions until the pressure of the spring 16 is overcome. The rotation of the socket 13 is limited in either direction by a projection 49 which lies in a recessed part 20 of the periphery of the socket 13.

The socket 13 is formed with an aperture 22 located with its axis coincident with a diameter of said socket and of the same configuration as the head of a T-bolt to be described later. The body 15 is also formed with an aperture 23 shaped so that the aperture 22 in the socket 13 registers therewith in two angular positions separated from one another by about 30°, and termed the "free" and "stowable" positions respectively. The socket has a third angular position, termed the "locked" position, separated from the "free" position by about 75° in the opposite angular direction to that in which the "stowable" position lies. The notches 17, 18, 19 corresponding respectively to the "locked," "free," and "stowable" positions formed on the periphery of the socket 13 for coaction with the circlip spring 16 are located so that the spring pressure maintains the socket in any of these three angular positions. Thus the socket 13 is prevented from rotating when the parts of the fastening devices are separated, and is therefore always in the correct position for mating when the parts are brought together.

A frame member 38, to which the panel 10 is to be secured, carries a member 24 which carries at its inner surface a housing or case 25 in which are a conical compression spring 26 and a barrel 27, through which passes a T-bolt 28, the head 29 of which extends through an aperture 30 in the member 24 towards the panel 10. The T-bolt has a slot 31 formed in its head 29, and is screwed into the barrel 27 (which is threaded to accommodate the bolt 28) and set in a predetermined axial position relatively thereto (dependent on the dimensions of the particular members which are to be secured together) after which the barrel 27 and T-bolt 29 are locked together by a split pin 32.

The case 25 and member 24 are secured by screws 36 and nuts 37 to a frame member 38 constituting the second member to which the first member (the panel 10) is to be secured. The frame member 38 is formed with an aperture 39 through which the head 29 of the T-bolt projects.

The case 25 is formed with two inwardly projecting radial lugs 33, and the barrel 27 is formed at its outer end with a flange 34 having two inwardly extending radial notches 35 arranged to permit the barrel 27 and T-bolt 28, in one predetermined angular position, corresponding with the "stowable" position of the head 29 of the T-bolt, to be moved axially inwards, after which, by further angular movement of the T-bolt 28 and barrel 27, the flange 34 of the barrel engages the lugs 33 and retains the T-bolt in the "stowed" position.

The aperture 39 in the frame member 38 is oversize so as to permit "wobble" of the T-bolt 28 in correcting misalignment while the head 29 is picking up the apertures 23, 22 in the body 15 and socket 13. Further, to facilitate the picking up, the margins of the aperture 23 are flared as at 40 on that side of the body 15 adjacent to the T-head bolt 28.

The conical spring 26 centralizes the T-bolt 28 and holds it in position against rotation when the parts of the device are separated, thus ensuring that the head 29 of the T-bolt is ready for mating with the body 15 and socket 13. Moreover, should the circlip spring 16 fail, the conical spring 26 assists in keeping the fastening device locked, and also it returns the T-bolt 28 from the "stowed" to the extended position.

The panel 10 is formed with indicating marks 41, 41a and 41b from which, by the position of the slot 31, it may be ascertained whether the device is in the "locked," "free," or "stowable" position. The position 41 corresponds to the "locked" position in which the spring 16 engages the notch 17; the position 41a corresponds to the "free" position in which the spring 16 engages the notch 18; the position 41b corresponds to the "stowable" position in which the spring 16 engages the notch 19.

If a "lift off" or hinged panel 10 is to be removed, the T-bolt head 29 is rotated by means, e. g. of a screw-driver, from the "locked" to the "free" position. In the "locked" position the apertures 22, 23 in the socket 13 and body 15 respectively were not coincident, and so the cross-limbs of the head 29 of the T-bolt engaged the margins surrounding the aperture 23 of the body, but in the "free" position the apertures are coincident, and therefore the panel 10 is free to be lifted or hinged away. Inward pressure by the screw-driver is resisted by the radial lugs 33 on the flange 34 of the barrel 27.

If a panel which must be slid during removal is to be freed, the T-bolt head 29 is rotated from the "locked" to the "stowable" position, in which not only is the socket aperture 22 in register with the body aperture 23, but also the barrel notches 35 are in register with the radial lugs 33. The T-bolt 28 can thus be pushed inward until the notches 35 lie behind the lugs 33 and can be turned so that the notches 35 are no longer in register with the lugs 33 and the bolt 28 is thus held by the engagement of the flange 34 behind the lugs 33, in its "stowed" position behind the general level of the member 38.

In either event, locking is accomplished by reversing the sequence of operations and turning the T-bolt 28 back to the "locked" position.

For instance, when the parts are in the "free" position, the T-bolt 28 is projecting outwards with its forward surface (i. e. the surface formed with the slot 31) as far forward as possible from the frame member 38. That is to say, the head 29 is in the position of Figure 3 but turned so that it will enter the aperture 23. In addition, the socket 13 is turned so that the aperture 22 registers with the aperture 23, with the circlip spring 16 engaging the notch 18. Thus, as the panel 10 is moved toward the frame member 38, the head 29 passes through the aperture 23 into the aperture 22 until the forward surface of the head 29 is flush with the outer surface of the spigot 12. A screw-driver is then inserted into the slot 31 and the head 29 turned so as to turn the socket 13 to the "locked" position, in which the spring 16 engages the notch 17. In this position the aperture 22 lies substantially at right angles to the aperture 23, as shown in Figures 3 and 5.

In the alternative case where the bolt is in the "stowed" position and the parts are to be locked together, the panel 10 is slid over the member 38 until the aperture 23 is in register with the aperture 39, the socket 13 being already in the position in which the circlip spring 16 engages the notch 19, having been moved there prior to the depression of the bolt to the position in which it is turned to the "stowed" position. A screwdriver is then passed through the three apertures 22, 23 and 39 to engage the slot 31. The head 29 is now turned so as to bring the radial notches 35 into register with the lugs 33 so that the spring 26 can force bolt 28 outwardly to the forwardmost position in which it lies in the aperture 22 ready to be turned to the "locked" position.

I claim:

1. A fastening device for securing two members together, comprising a body formed with an aperture and adapted for attachment to the first of said members, means forming a bearing in said body, an apertured socket mounted on said body and rotatable in said bearing to a plurality of angular settings, an apertured support adapted for attachment to the second of said members and adjacent said body when said members are in fastened position, T-shaped bolt means mounted in said support for rotation therein and axial sliding movement through the aperture thereof, spring means connected between said bolt means and said support urging said bolt through said apertured support, the apertures in said body and said socket generally matching the configuration of the head of said bolt so that when aligned said bolt head can pass through the aperture in said body and remain in the aperture of said socket but when rotated with said socket to a first angular setting will overlap the margins of the aperture in the body to prevent the passage of said bolt head through said body aperture, and means connected to said support for engaging said bolt means to retain said bolt means, substantially within said support, against the action of said spring.

2. A fastening device according to claim 1 in which notches are formed in the assembly comprising said socket and said body, and spring detent means mounted in said assembly and cooperating with said notches to determine the angular setting of said socket.

3. An arrangement as set forth in claim 1 in which said bolt means has a shank, and in which said last-named means comprises an abutment on said support adjacent the shank of said bolt means, and a cooperating projection on the shank of said bolt means engageable with said abutment.

4. A fastening device for securing two members together as claimed in claim 1, wherein that face of the body normally directed towards the second member is flared around the aperture and facilitates engagement of the head of the T-shaped bolt in the aperture when the bolt and aperture are slightly out of register.

5. A fastening device for securing two members together as claimed in claim 1, having means providing axial adjustment of said bolt, to enable said bolt to be adapted to the size of said body, said adjustment means being independent of the fastening and unfastening movements of the device.

6. A fastening device for securing two members together, comprising a body formed with an aperture and adapted for attachment to the first of said members, means forming a bearing in said body, an apertured socket mounted on said body and rotatable in said bearing to a plurality of angular settings, an apertured support adapted for attachment to the second of said members and adjacent said body when said members are in fastened position, T-shaped bolt means mounted in said support for rotation therein and axial sliding movement through the aperture thereof; the aperture in said body and said socket generally matching the configuration of the head of said bolt so that, when said socket is in a first angular setting aligning its aperture with the aperture of said body, said bolt head can pass through the aperture in said body and remain in the aperture of said socket but when rotated with said socket to a second angular setting said bolt head will overlap the margins of the aperture in the body to prevent the passage of said bolt head through said body aperture.

7. A fastening device for securing two members together as claimed in claim 6, wherein that face of the body normally directed towards the support is flared around the aperture and facilitates engagement of the head of the T-shaped bolt in the aperture when the bolt and aperture are slightly out of register.

8. A fastening device according to claim 6 in which notches are formed in the assembly comprising said socket and said body, and spring detent means connecting said socket and said body and cooperating with said notches to determine the angular setting of said socket.

9. A fastening device for securing two members together, comprising, in combination, a bolt, means adapted for mounting said bolt for rotating and axial sliding movement with respect to the first of said members, abutment means on said mounting means and on the bolt to limit the outward movement of said bolt from the mounting means, said bolt being formed with a cross-piece, a fastening element adapted for attachment to said second member and being formed with an aperture through which said cross-piece can pass prior to being turned so as to overlap said fastening element and thereby prevent said members from being separated, and resilient means urging said bolt in an outward direction, said bolt being shaped so as to be actuated from the side of said second member remote from said first member by being turned from said overlapping position and thrust inwardly through said aperture against said resilient means, thereby unfastening the device.

10. An arrangement as set forth in claim 9, comprising a socket rotatably mounted on said fastening element on the side thereof remote from said mounting means and formed with an opening shaped to fit around said cross-piece after the latter has passed through said aperture in said fastening element, the faces of said cross-piece, said socket and said second member being substantially flush with one another.

11. An arrangement as set forth in claim 9, comprising a socket rotatably mounted on said fastening element on the side thereof remote from said mounting means and formed with an opening shaped to fit around said cross-piece after the latter has passed through said aperture in said fastening element, and detent means engaging said socket and adapted to arrest said socket in a plurality of angular positions with respect to said fastening element.

ARCHIE THOMAS BAILEY.

REFERENCES CITED

The following references are of record in the file of this patent:

UNITED STATES PATENTS

| Number | Name | Date |
| --- | --- | --- |
| 1,733,650 | Cummings | Oct. 29, 1929 |
| 2,084,558 | Holmes | June 22, 1937 |
| 2,095,271 | Swanstrom | Oct. 12, 1937 |
| 2,422,304 | Johnson | June 17, 1947 |
| 2,442,064 | Veit | May 25, 1948 |
| 2,462,141 | Storer | Feb. 22, 1949 |